United States Patent [19]

Broch

[11] 4,214,785
[45] Jul. 29, 1980

[54] INTEGRAL MANIPULATOR, IN PARTICULAR FOR GLASS PANES, PLATES OR METAL SHEETS

[75] Inventor: Eberhard Broch, Solingen, Fed. Rep. of Germany

[73] Assignee: Josef Bohle, Solingen, Fed. Rep. of Germany

[21] Appl. No.: 940,048

[22] Filed: Sep. 6, 1978

[51] Int. Cl.² .............................................. A47G 35/00
[52] U.S. Cl. .................................................. 294/64 R
[58] Field of Search ....................... 294/64 R; 401/88; 248/206, 359

[56] References Cited

U.S. PATENT DOCUMENTS

| | | | |
|---|---|---|---|
| 2,287,576 | 6/1942 | Solomon | 294/64 R |
| 3,697,111 | 10/1972 | Thompson | 294/64 R |

*Primary Examiner*—James B. Marbert
*Attorney, Agent, or Firm*—John C. Smith, Jr.

[57] ABSTRACT

An integral manipulator, in particular for glass panes, plates or metal sheets possesses a centrically arranged grip and may be attached by means of a suction dish to planar or slightly curved smooth surfaces. At the suction dish of the integral manipulator consisting of rubber-resilient material between the suction edge and the grip there is arranged a circumferential gripping edge.

3 Claims, 2 Drawing Figures

INTEGRAL MANIPULATOR, IN PARTICULAR FOR GLASS PANES, PLATES OR METAL SHEETS

BACKGROUND OF THE INVENTION

This invention relates to an integral manipulator, in particular for glass panes, plates and metal sheets, which has a centrically arranged grip and which may be attached by means of a suction dish to planar or slightly curved smooth surfaces.

A manipulator with various suction dishes has already become known from German Pat. No. 1,051,198. The known manipulator has a rubber plate by means of which it may be applied to a smooth surface by producing a vacuum between the rubber plate and the surface, temporarily. The conventional manipulator is provided at the side remote from the smooth surface, of the rubber plate, with a lever arrangement for stripping off the rubber plate so that in doing so a vacuum and an attachment to the plate is achieved.

In order to be able to release a simple manipulator after being applied to a smooth surface therefrom again, it is required that the vacuum be released. For accomplishing this, flat objects or tools, for instance screw drivers, are used, but then the annular seal of the rubber plate of the suction dish is subjected to possible damaging, so that upon re-using a permanent vacuum and thus attachment to the smooth surface is no longer achievable.

SUMMARY OF THE INVENTION

It is the object of the present invention to avoid this disadvantage and to provide a simple manipulator which after being attached to a smooth surface easily may be detached therefrom again.

To attain this object the present invention provides an integral manipulator, in particular for glass panes, plates or metal sheets, comprising (a) a suction dish for attaching the manipulator made of rubber-resilient material to a planar or slightly curved smooth surface, said suction dish having an upper surface providing a circumferential gripping edge and a base formed with a cavity so as to leave an annular suction edge surrounding the cavity in the base, and (b) a grip projecting upwardly from the center of the upper surface of the suction dish, the circumferential gripping edge of the suction dish being provided between said suction edge and said grip.

The suction edge of the suction dish may have a larger circumference than the gripping edge so that the gripping edge is closer to the grip.

The essential advantage of the invention is that a manipulator with a rubber-resilient suction dish after grasping the grip may easily be detached from a plate in that the thumb is engaged underneath the gripping edge and it is lifted so that also the annular suction edge of the suction dish is lifted and thus the vacuum relative to the plate is released.

BRIEF DESCRIPTION OF THE DRAWINGS

Two embodiments of the invention will now be described by way of example and with reference to the accompanying drawings in which.

DESCRIPTION OF THE PREFERRED EMBODIMENTS

Figure 1:
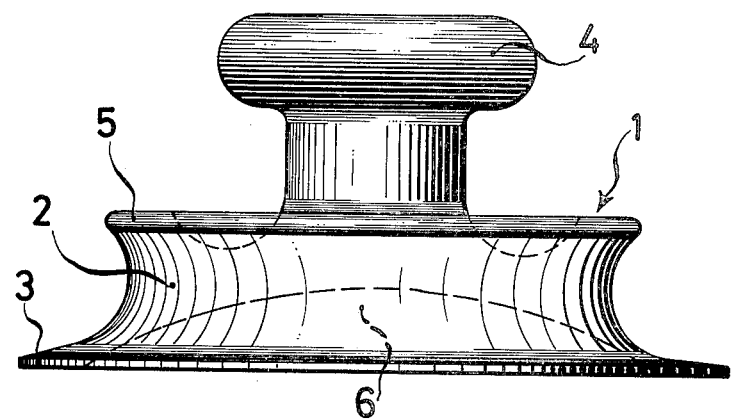
FIG. 1 is a side-elevational view of a manipulator according to the invention.

FIG. 1 shows an integral manipulator 1 which is made of rubber-resilient material and provided with a suction dish 2 possessing a cavity 6 in its base and an annular suction edge 3 surrounding the cavity 6 for sealingly engaging a not illustrated smooth surface of a glass pane, plate or metal sheet. In the center of the manipulator 1, a grip 4 projects upwardly from the upper surface of the suction dish 2. Between the suction edge 3 and the grip 4, there is a circumferential gripping edge 5 integrally formed in such a way that after grasping the grip 4 with one hand the thumb of this hand may be placed underneath the gripping edge 5 and this may be lifted for releasing the vacuum. Such a manipulator 1 may be made in larger dimensions when, as shown in FIG. 1, the gripping edge 5 has a smaller diameter than the suction edge 3. For attachment of the manipulator 1, it is merely required to grasp the manipulator 1 at the grip 4 and to urge it with the suction dish 2 against the smooth surface, the air being expelled from the cavity 6 in the base of the suction dish 2 in part and the suction edge 3 being firmly engaged with the smooth surface.

Figure 2:
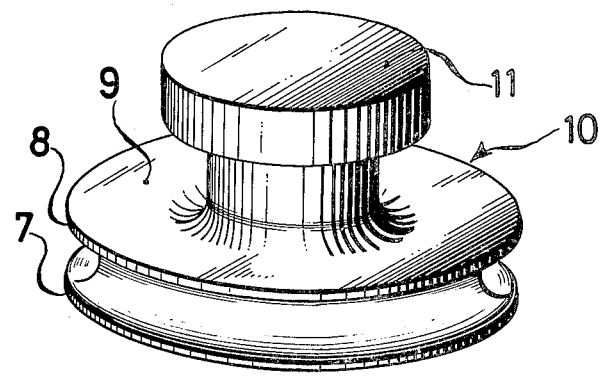
FIG. 2 is a side-elevational view, seen slightly from above, of a manipulator according to another embodiment.

FIG. 2 shows an integral manipulator 10 which comprises a grip 11 and has dimensions smaller than those of the manipulator 1 according to FIG. 1. In this case the circumference of the suction edge 7 of the suction dish 9 is so chosen that it generally corresponds to the circumference of the gripping edge 8.

For an easier manipulation, the diameter of the gripping edge 5 or 8 to advantage is made larger than the external diameter of the grip 4 or 11.

The invention may be embodied in other specific forms without departing from the spirit or the essential characteristics thereof. The embodiments are therefore to be considered in all respects as illustrative and not restrictive.

What is claimed is:

1. An integral manipulator for engaging planar or slightly curved smooth surfaces of articles such as glass panes, plates, metal sheets or the like, comprising:
    (a) a base member of resilient material and comprising
        (1) a cavity surrounded by an annular suction edge for engaging said surface of said article, said cavity and annular suction edge being at one side of said base member;
        (2) an annular gripping edge spaced from said annular suction edge, said annular gripping edge being at the side of said base member opposite said one side thereof; and
        (3) an intermediate annular section disposed between said annular suction and gripping edges, the circumference of said intermediate annular section being less than that of said annular gripping edge forming an undercut at the side of said annular gripping edge facing said annular suction edge; and
    (b) a handle mounted on said opposite side of said base member;
    (c) whereby said manipulator may be released from an article surface by manually engaging a portion of the undercut surface adjacent said annular gripping edge and pressing a portion of said annular gripping edge in a direction away from said article surface to draw a portion of said annular suction edge away from said article surface to release the suction within said cavity.

2. An integral manipulator according to claim 1 wherein the circumference of said annular suction edge is greater than the circumference of said gripping edge.

3. An integral manipulator according to claim 1 wherein said handle on said opposite side of said base member is spaced inwardly from said annular gripping edge, an annular cavity being formed in the surface of said opposite side of said base member about said handle and inwardly of said annular gripping edge to facilitate the pressing of a portion of said annular gripping edge away from said article to draw a portion of said annular suction edge away from said article surface to release the suction within said cavity.

* * * * *